Figure 1:
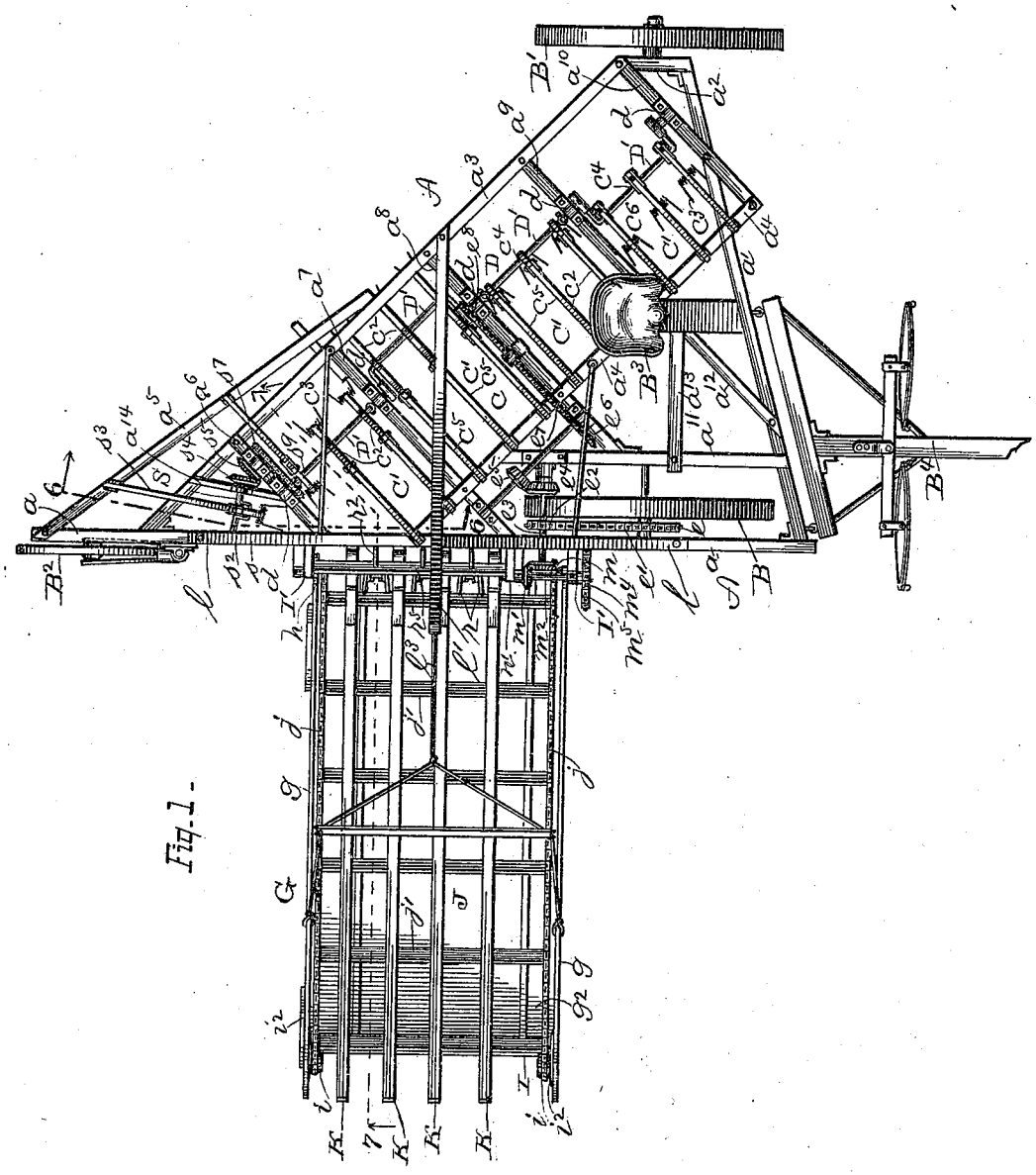

(No Model.) 5 Sheets—Sheet 1.
M. REW.
HAY RAKE AND LOADER.

No. 502,679. Patented Aug. 1, 1893.

Witnesses:
Harry M. Richards
C. Hultgren

Inventor:
Madison Rew,
By W. B. Richards,
Atty.

(No Model.) 5 Sheets—Sheet 2.
M. REW.
HAY RAKE AND LOADER.
No. 502,679. Patented Aug. 1, 1893.
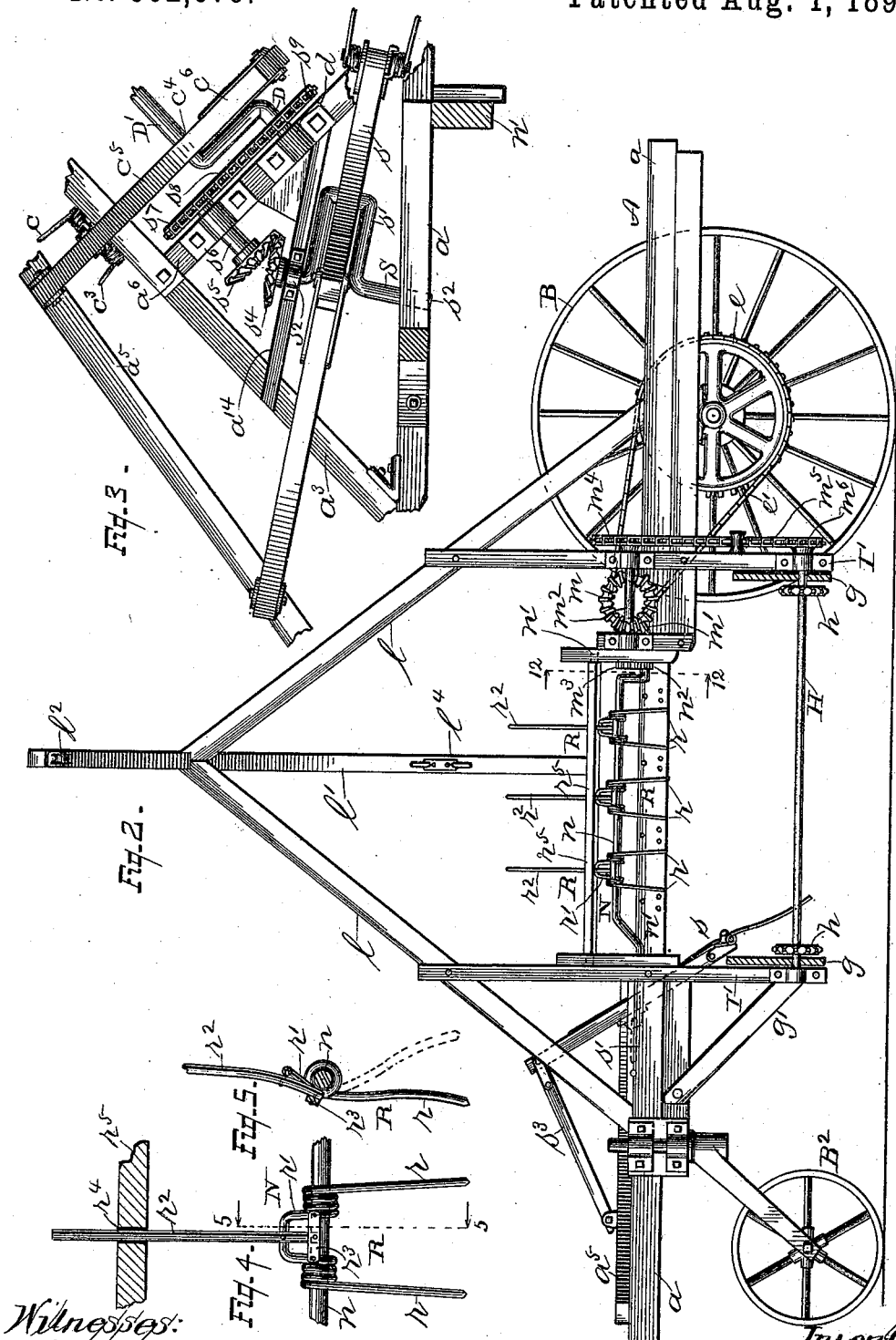
Witnesses:
Harry M. Richards.
C. Hultgren
Inventor:
Madison Rew,
By W. B. Richards
Atty.

(No Model.)  M. REW.  5 Sheets—Sheet 3.
HAY RAKE AND LOADER.
No. 502,679.  Patented Aug. 1, 1893.
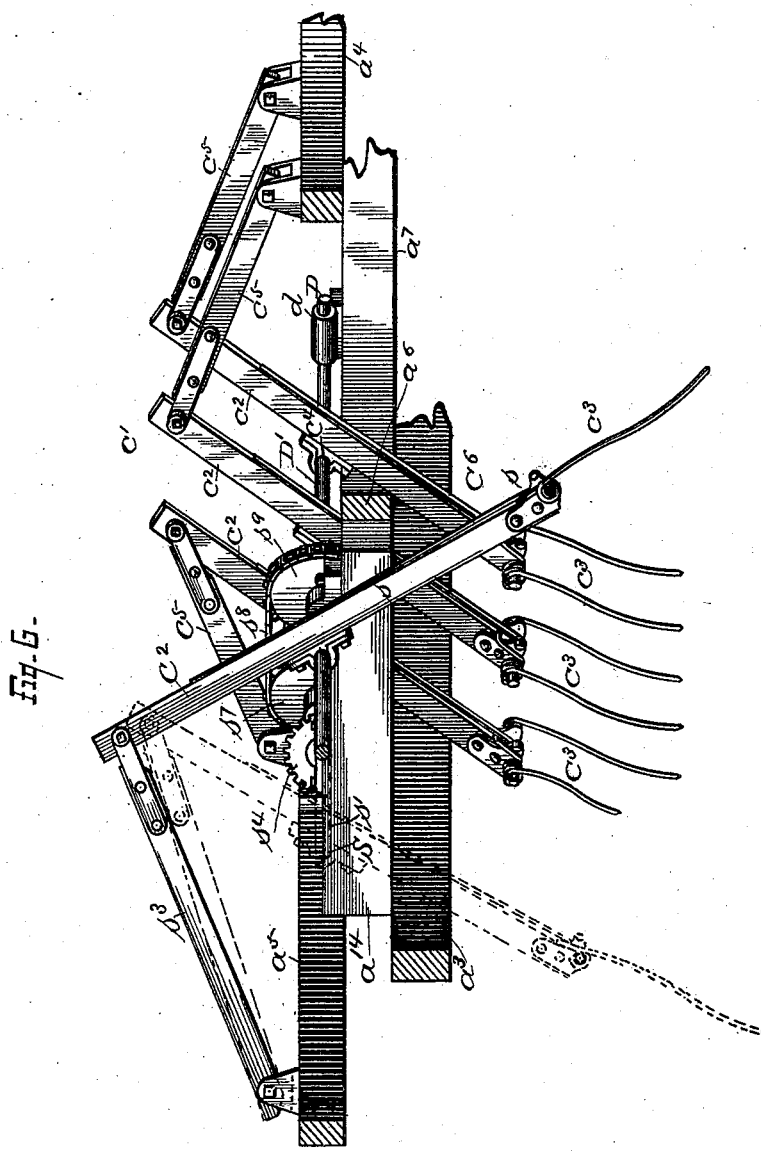
Witnesses:
Harry M. Richards.
C. Hultgren
Inventor:
Madison Rew,
By W. B. Richards,
Atty.

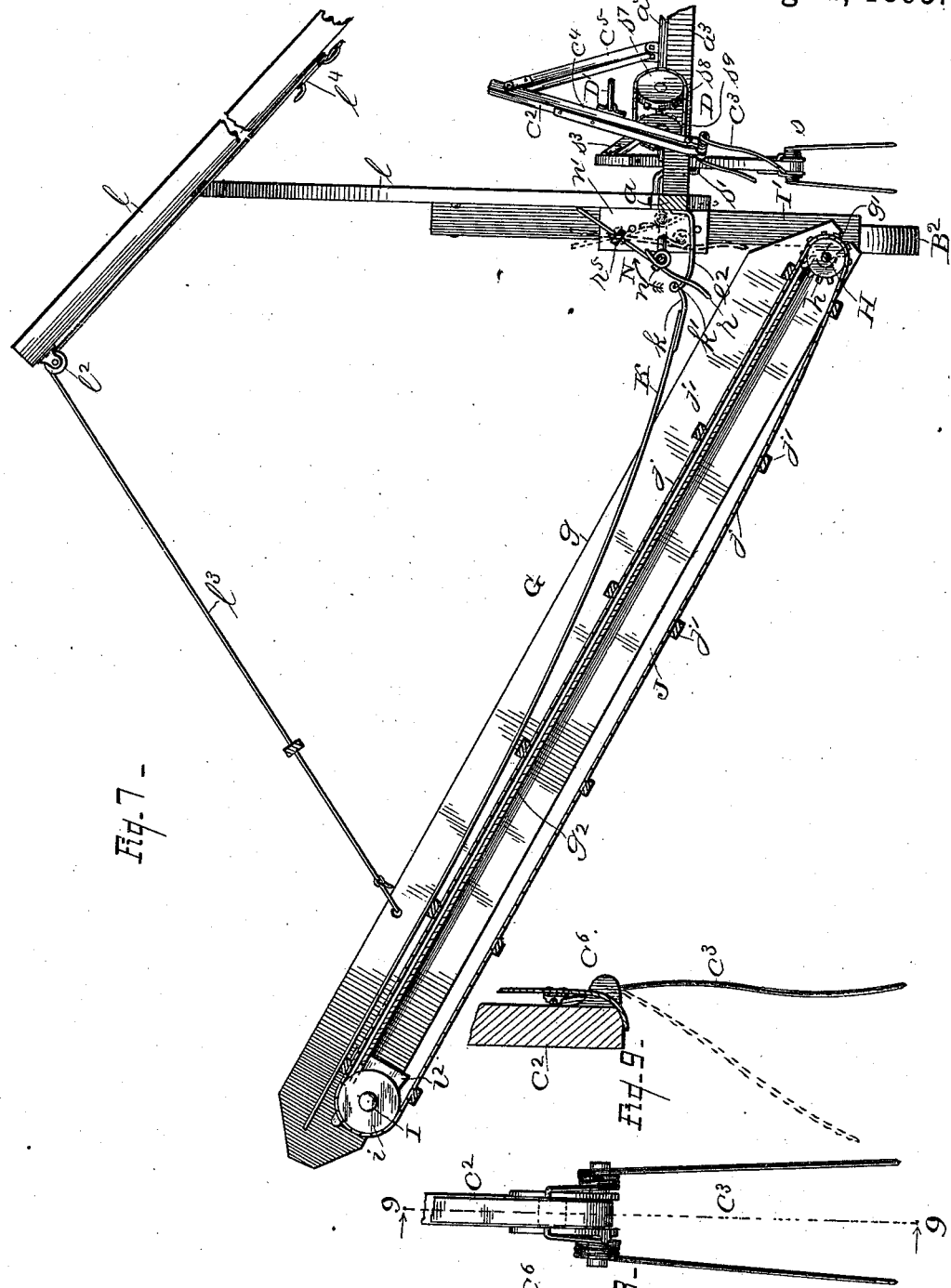

(No Model.)
M. REW.
HAY RAKE AND LOADER.
No. 502,679.
Patented Aug. 1, 1893.
5 Sheets—Sheet 5.
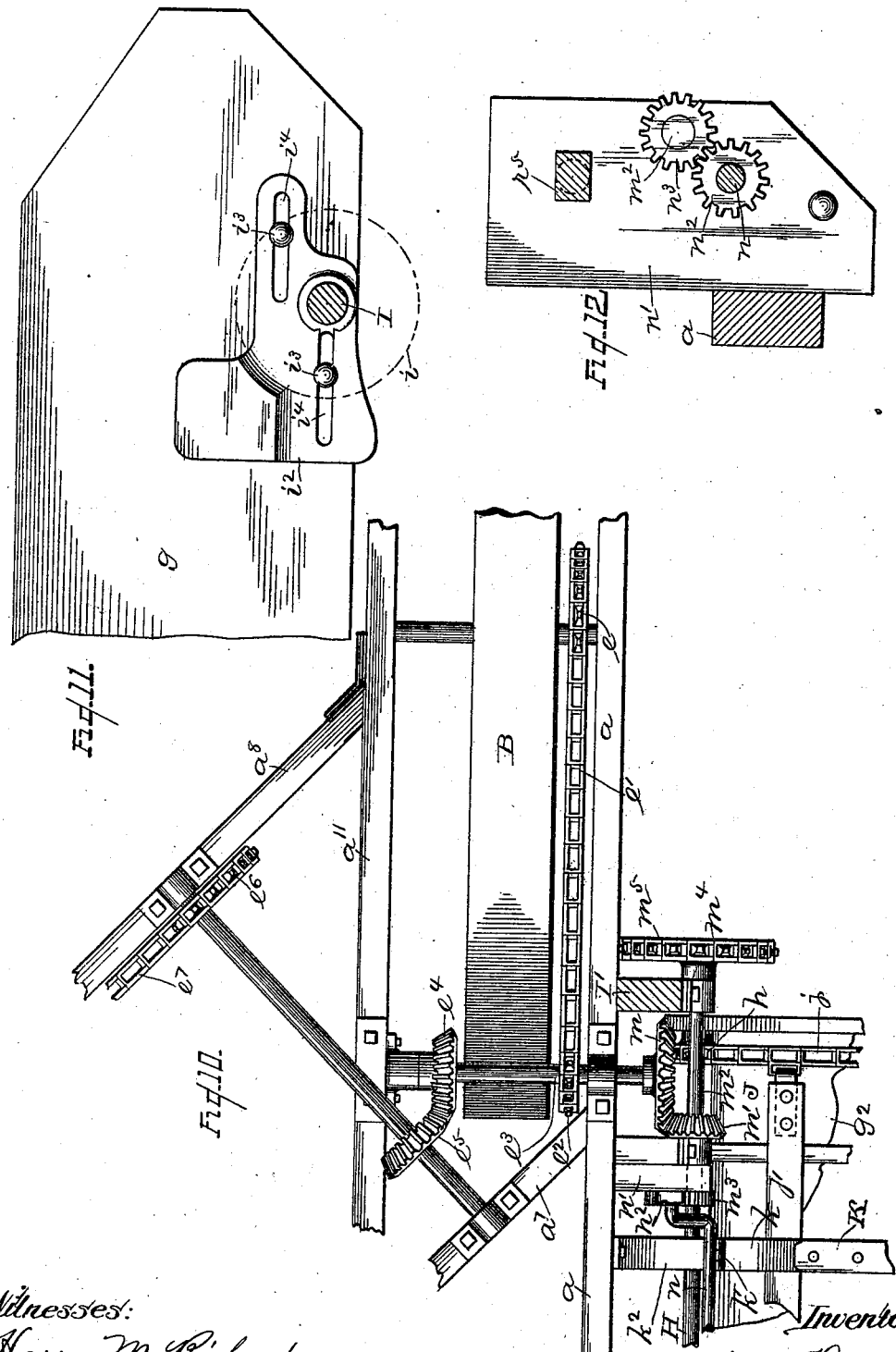
Witnesses:
Harry M. Richards.
C. Hultgren
Inventor:
Madison Rew,
By W.B. Richards,
Atty.

UNITED STATES PATENT OFFICE.

MADISON REW, OF GRINNELL, IOWA, ASSIGNOR OF ONE-THIRD TO THE CHAMBERS, BERING, QUINLAN COMPANY, OF DECATUR, ILLINOIS.

HAY RAKE AND LOADER.

SPECIFICATION forming part of Letters Patent No. 502,679, dated August 1, 1893.

Application filed January 6, 1893. Serial No. 457,460. (No model.)

*To all whom it may concern:*

Be it known that I, MADISON REW, a citizen of the United States, residing at Grinnell, in the county of Poweshiek and State of Iowa, have invented certain new and useful Improvements in Hay Rakes and Loaders, of which the following is a specification.

In that class of side delivery hay-rakes in which a supporting frame mounted on wheels carries a rake journaled on a rotating crank-shaft, or a series or gang of rake sections hinged or journaled to a rotating multiple-crank-shaft in such manner that the rake sections have with their operating cranks successional throws, and in which said crank-shaft is itself located on and with reference to the machine, and also holds the rake-sections or the gang of sections in positions oblique to the line of travel of the machine, whereby each rake section will throw or toss the hay obliquely forward, and the series or gang of rake sections by their united action will deliver the hay at the side of the machine, in a windrow co-incident with or paralleling the path of the machine, a type of which hay-rakes is shown in Letters Patent No. 452,319, granted to me May 12, 1891. There has not, to my knowledge, heretofore been any means known or used for receiving the hay as it is delivered by the rake or gang of rakes at the side of the machine, and elevating it for delivery on a wagon or other receiver, moving coincidently with the raking machine; and my invention has for its main object to provide suitable means which while carried upon a hay-rake of the type hereinbefore referred to are operated by suitable gear connection therewith and are combined therewith in such manner as to receive the hay as it is delivered by such rakes at the side of the machine, and elevate and discharge it on any suitable wagon or other receiver.

To this main end and object my invention consists in the combination with a hay rake of the class or type hereinbefore referred to, and in which the hay is delivered at the side of the machine from rakes obliquely located with reference to the line of travel of the machine, of a hay elevator located at one side of the machine, where it will receive the hay from the rakes, and while it elevates the hay will at the same time carry it laterally from the machine for delivery to any suitable wagon or other receiver, and which hay elevator is mounted and carried on the hay rake frame, and is operated by gear connection with the hay rake operating mechanism.

To this main end and object my invention also further consists in the combination with a hay rake of the class or type hereinbefore referred to, and in which the hay is delivered at the side of the machine from rakes obliquely located with reference to the line of travel of the machine, of a hay elevator located at one side of the machine and at such an angle with reference to the rakes as to adapt it to operate to receive the hay therefrom, and while it elevates the hay, at the same time to carry the hay laterally in a line at right angles with or approximately at right angles with the line of travel of the machine, and which hay elevator is mounted and carried upon the hay-rake frame, and is operated by gear connection with the hay-rake operating mechanism.

Other objects of my invention consist in novel structural features, and in combinations of devices, the operation of which devices separately and in combination will be found hereinafter fully described, and the combinations of which devices will be specified in the claims of this specification.

In the accompanying drawings, all my improvements are shown as embodied in the best way now known to me; obviously, however, some of these improvements may be structurally different from that shown, and may be used without the others, and in hay-rakes differing in construction and to some extent in organization from the one shown in said drawings, in which—

Figure 1 is a top-plan of a side delivery hay-rake, combined with my side delivery hay-elevator, and auxiliary parts hereinafter described; Fig. 2, an enlarged side elevation showing the side of the rake frame next the hay elevator, the supporting and driving wheels, the forks for facilitating the passage of the hay to the elevator, and other adjacent parts, as they appear with the elevator removed, except the sides thereof which are shown in section, and part of its driving gear;

Fig. 3, an enlarged top-plan of parts shown at the rear of Fig. 1. In this figure the auxiliary fork $s$ is shown in a different position in its orbit or operation, and hence in a different relative position to other parts to that shown at Fig. 1, and is shown in same position in its orbit or operation, and same position with reference to other parts as at Fig. 2. The next rake to it is also shown in a different position from what is shown at Fig. 1; Fig. 4, an enlarged front elevation of one of the feeder forks shown at Fig. 2, and of part of the crank-shaft which carries it, and a sectional elevation of part of the check-bar which holds it in upright working positions; Fig. 5, a sectional elevation in line 5, 5, in Fig. 4; Fig. 6, an enlarged sectional elevation, in the line 6, 6, in Fig. 1, but showing the auxiliary fork $s$ in different position in its orbit and different relative position to the rakes $c^6$ from that shown at Fig. 1, and in same position as shown at Figs. 2 and 3; Fig. 7, an enlarged sectional elevation in line 7, 7, in Fig. 1, and elevation of other adjacent parts, as hereinafter fully described; Fig. 8, an enlarged front elevation of one of the rake-forks; Fig. 9, a sectional elevation in line 9, 9, in Fig. 8; Fig. 10, an enlarged top plan of the drive-wheel, and its main gear connections with the multiple crank-shaft, the hay elevator, and the feeder fork crank-shaft; Fig. 11, an enlarged elevation showing the inner side of the upper end of one side board of elevator spout, and elevation of adjustable bearing for the carrier belt; Fig. 12, an enlarged sectional elevation in the line 12, 12, in Fig. 2.

In practice I have applied my present invention to a side delivery hay rake of the same type or class as that shown and described in my patent hereinbefore referred to, but inasmuch as the hay raking machine which is shown and described in this application differs structurally and in some other respects from the machine shown and described in said patent, I have hereinafter more fully described it than would otherwise have been deemed necessary.

In the several figures the same part is designated by the same reference letter.

The frame A shown in the drawings is approximately triangular in its outlines, and is formed of bars $a, a', a^2, a^3, a^4, a^5, a^6, a^7, a^8, a^9, a^{10}, a^{11}, a^{12}, a^{13}, a^{14}$, supported on the wheels B, B', B$^2$,—the rear wheel B$^2$ being a caster-wheel. The driver's seat B$^3$ is supported on the frame A, and the tongue B$^4$ is hinged to the forward side of said frame. The crank-shaft D is a multiple-crank-shaft, journaled at $d$ to the frame bars $a^6, a^7, a^8, a^9$ and $a^{10}$, oblique to the line of travel of the machine, and has its cranks D' disposed in different planes radially of its axis of rotation.

The gang C of rakes, shown entire at Fig. 1, is formed of sections $c'$, each of which sections contains a series of rakes $c^6$, each having a handle $c^2$ with rake teeth $c^3$ at its lower end, and each handle is pivoted at $c^4$ to a crank D', so that all the rakes $c^6$ in a section revolve together, simultaneously. The upper end of each handle $c^2$ is pivotally connected with one end of a link or check-bar $c^5$, the other end of which check-bar is pivoted to the frame bar $a^4$, except the check-bar next the delivery side of the rakes, which is preferably hinged or pivoted to the bar $a^5$, for purposes hereinafter described.

When the multiple-crank-shaft is rotated, each crank D' will carry its attached section of rakes around in an orbit, while each rake of the section is held by a check-bar $c^5$, in a substantially vertical or upright working position. The rake teeth $c^3$ are connected in an ordinary manner with their respective handles $c^2$ by a spring which permits them to yield to pass over obstructions—see Figs. 8 and 9.

The shaft of the wheel B carries a sprocket-wheel $e$ that gears by a sprocket chain $e'$ with a sprocket wheel $e^2$, the shaft $e^3$ of which carries a bevel pinion $e^4$ that gears with a similar pinion $e^5$, the shaft of which carries a sprocket wheel $e^6$, which gears by means of a sprocket chain $e^7$ with a sprocket $e^8$ which is fixed to the crank shaft D, and thus the wheel B rotates the multiple crank-shaft D as the machine is drawn forwardly, and thereby gives to the rake sections the orbital revolutions specified.

The hay elevator spout G has side boards $g$, the lower ends of which have slots $g'$ which rest upon a shaft H that is journaled upon upright bars I' that are fixed to the side frame bars $a$ in such manner that the elevator spout projects laterally at a right angle to the line of travel of the machine. A floor $g^2$ connects the sides $g$. The hay carrier belt or elevator belt J which runs in the spout G has side sprocket chains $j$ connected by lags $j'$. The sprocket chains $j$ gear with sprocket wheels $h$ which are fixed to and rotated with the shaft H. The upper end of the elevator spout has a shaft I with pulleys $i$ on which the belt J runs. The shaft I has bearings in blocks $i^2$ which are adjustable lengthwise of the side boards $g$ for the purpose of adjusting the tension of the hay carrier belt, and are fixed after such adjustments by bolts $i^3$ which pass through slots $i^4$ in the plates $i^2$, and into the sides $g$, as shown at Fig. 11. Wind guards K are fixed at one end to spring plates $k$ that are hinged at $k'$ to brackets $k^2$ that are fixed to the bar $a$,—see Figs. 7 and 10. The lower ends of the wind guards K are some distance above the hay elevating belt so as to leave a large throat or entrance between them for the hay, and toward their outer ends converge to and rest upon said belt, (see Fig. 7,) with a spring pressure, so as to permit the hay to pass upwardly with the belt beneath it, and at the same time to hold it in place on the belt.

Bars $l, l, l'$, form a tripod supported on the frame A, and the bar $l'$ is provided with a pulley $l^2$ over which a cord $l^3$ runs from the outer end of the elevator spout to a belaying pin $l^4$ also fixed to the bar $l$. By the cord $l^3$ the height of the outer end of the elevator and its spout may be adjusted and fixed as desired, the lower end of the side boards $g$ turning freely on the shaft H for that purpose. The bars I' extend below the frame A and carry the lower end of the elevator belt close enough to the ground to insure its receiving the hay as hereinafter described.

The shaft $e^3$ of the sprocket wheel $e^2$ is extended beyond the frame bar $a$, where it carries a bevel pinion $m$ which gears with a bevel pinion $m'$ on a shaft $m^2$ that has on one end a spur pinion $m^3$, and on its other end a sprocket wheel $m^4$. The sprocket wheel $m^4$ is geared by a sprocket chain $m^5$ with a sprocket wheel $m^6$ on the end of the shaft H, whereby the drive wheel B is made to operate the hay carrier belt J in an evident manner through gear connection with the shaft $e^3$ which also operates the multiple-crank-shaft.

The operations of the rake sections in collecting the hay without packing it, and in such loose condition that it will cure more rapidly and effectually, with a minimum of exposure to the action of the sun and weather in bleaching it, and the operations of said rake sections C in raking the hay as they sweep forwardly at their lower raking ends, while revolved by their respective cranks D' and held in upright working positions by the check-rods $C^5$, and each preceding section tossing or throwing the hay forward and laterally to be received by its succeeding section, finally to be delivered at the side of the machine, does not differ in any material respect from the operation of the rake sections in my patent hereinbefore referred to, and with an elevator mounted as shown and described, with reference to such side delivery hay-rake, under ordinary circumstances the hay will be received as delivered by the rakes and be carried laterally by the elevator for delivery from its elevated end to any suitable accompanying receiver, not shown. Windy days, difficult hay to rake, and other interfering matters may, however, cause a portion of the hay to not enter, or not readily enter the elevator, and the doctor or feeder N is designed to provide for such exigencies. The doctor or feeder N shown, consists of a crank-shaft $n$, journaled in blocks $n'$ and provided at one end with a spur pinion $n^2$ which gears with the pinion $m^3$ (see Fig. 2) on the shaft $m^2$, from which the crank shaft $n$ receives motion. The crank shaft $n$ extends across and above the lower end of the elevator, as shown at Figs. 2 and 7, and carries forks R, the prongs $r$ of which are coiled spirally on the crank part of the shaft $n$, (see Figs. 4 and 5,) and have their mid-length parts bent to form a ∪-shaped loop $r'$. A handle $r^2$ is fixed at its lower end to a bar $r^3$ which is fixed to the side parts of the loop $r'$, and is also fixed to the upper part of said loop. Each handle $r^2$ extends upwardly and passes loosely through a hole $r^4$ in a rock bar $r^5$ which is journaled in the blocks $n'$ above the crankshaft $n$. The crank shaft $n$ being rotated in the direction shown by the arrow at Fig. 7, will impart to the forks R an orbital movement, while the fork handles passing through the rock-bar will retain the forks in upright working positions, so that they by coming in contact with the upper portions of the hay as it is delivered at the side of the rake gangs, will aid in feeding it forward to the elevator belt. The spring prongs $r$ are coiled loosely on the shaft $n$, to permit of their yielding when they meet obstructions or resistance, as shown by dot lines at Fig. 5.

The doctor or feeder N is economic of manufacture, simple in construction and very efficient in operation; it will be evident however that other feeders may be used, and hence I do not limit my claim for a doctor or feeder in combination with a side delivery hay-rake and hay elevator to the particular doctor or feeder shown and described.

Under certain circumstances a portion of the hay moved by the gang of rake sections to their discharging side might escape delivery to the elevator, by passing backwardly from the last section of rakes, and to prevent such escape of hay I have provided the auxiliary rake or fork $s$, which is mounted on an auxiliary crank-shaft S, with a crank $s'$, and given an orbital movement thereby in same manner as the rakes $c^6$. The crank-shaft $s$ is journaled to the frame bars at $s^2$ in a line at right angles or approximately so with the line of travel of the machine, whereby it revolves the fork $s$ in an orbital plane, approximately such as shown at Fig. 1, and being located where shown, it will receive any hay that might escape rearwardly and toss or throw it forwardly and somewhat laterally toward the elevator, to be taken up by the stream of hay flowing to the elevator. The fork $s$ is held in an upright working position by a check-bar $s^3$ which is hinged at one end to the upper end of the fork, and at its other end to the frame bar $a^5$.

The crank-shaft S is rotated by means of a bevel pinion $s^4$ on its end, (see Fig. 3,) which gears with a bevel pinion $s^5$ on a shaft $s^6$ that carries a sprocket wheel $s^7$, which gears by a sprocket chain $s^8$ with a sprocket wheel $s^9$ on the crank-shaft D, whereby the crank-shaft S is rotated with all rotations of the crank-shaft D'. The fork $s$ is preferably mounted, as shown, so that its movement forwardly at its lower end will alternate with the same movement of the rake $c^6$ which is next to it.

To further insure the hay passing properly to the elevator, I prefer connecting that check bar $c^5$ of the rake $c^6$ which is next to the fork $s$ to the rear frame bar $a^5$, whereby it is made to pass through the lower part of its revolution following or after the last rake preceding it and in the same section, has passed through that part of its revolution, as shown at Fig. 1. If preferred however, the check bar $c^5$ may be connected or hinged to the frame, forward of the rake $c^6$, or its upper end.

What I claim as new, and desire to secure by Letters Patent, is—

1. In a hay rake and loader, in combination, substantially as hereinbefore described, with a hay rake in which a rotary crank-shaft which is journaled on the machine oblique to its line of travel receives its rotary motion by gear connection with a driving wheel, and carries and gives orbital revolutions to the rakes while held by suitable mechanism in upright working positions, to collect and deliver the hay at the side of the machine, a hay elevator connected with said machine at one side thereof, where it will receive the hay as it is delivered by the rakes, carry it laterally and elevate it, by means of elevating mechanism operated by gear connection with the driving mechanism of the rotating crank-shaft.

2. In a hay rake and loader, in combination, substantially as hereinbefore described, with a hay rake in which a rotary crank-shaft which is journaled on the machine oblique to its line of travel, receives its rotary motion by gear connection with a driving wheel, and carries and gives orbital revolutions to the rakes while they are held by suitable mechanism in upright working positions, to collect and deliver the hay at the side of the machine, a hay elevator connected with said machine and at one side thereof, where it will receive the hay as it is delivered by the rakes, carry it laterally at right angles to the line of travel of the machine, and elevate it by means of elevating mechanism operated by gear connection with the driving mechanism of the rotating crank-shaft.

3. In a hay rake and loader, in combination, substantially as hereinbefore described, with a hay rake in which a rotary crank-shaft which is journaled on the machine oblique to its line of travel, receives its rotary motion by gear connection with a driving wheel, and carries and gives orbital revolutions to the rakes while held by suitable mechanism in upright working positions, to collect and deliver the hay at the side of the machine, and a hay elevator connected with said machine at one side thereof, where it will receive the hay as it is delivered by the rakes, and carry it laterally and elevate it by means of elevating mechanism operated by gear connection with the driving mechanism of said crank shaft, a doctor or feeder, located where it will act upon the hay as delivered by the rakes and aid its passage to the elevator.

4. In a hay rake and loader, in combination substantially as hereinbefore described, with a hay rake in which a rotary crank-shaft which is journaled on the machine oblique to its line of travel, receives its rotary motion by gear connection with a driving wheel, and carries and gives orbital revolutions to the rakes while held by suitable mechanism in upright working positions, to collect and deliver the hay at the side of the machine, and a hay elevator connected with said machine at one side thereof, where it will receive hay as it is delivered by the rakes, and carry it laterally and elevate it by means of mechanism operated by gear connection with the driving mechanism of said crank-shaft, a crank-shaft located across and above the hay receiving end of the elevator, rotated by gear connection with the driving mechanism of the rakes and elevator, and provided with forks to which it gives orbital revolutions, while they are held in upright working positions, to act in feeding the hay to the elevator.

5. In a hay rake and loader, in combination substantially as hereinbefore described, with a hay-rake substantially of the side delivery class herein described, and a hay elevator projecting laterally therefrom, a crank shaft, located across and above the hay receiving end of the elevator, rotated by gear connection with the driving mechanism of the hay rakes, and provided with forks, the prongs of which are spirally coiled on the crank of said shaft, and the handles of which pass through a rock-bar to hold them in upright working positions, while they are revolved in orbital planes by the crank shaft, substantially as described.

6. In a hay rake and loader, in combination substantially as described, with a hay rake substantially of the side delivery class described herein, and a hay elevator projecting laterally therefrom, a crank shaft $n$ carrying forks R pivotally mounted thereon, and with their upper ends or handles seated in holes in a rock bar $r^5$, said crank shaft having a pinion $n^2$ which gears with a pinion $m^3$ on a shaft $m^2$ which carries pinions $m'$ and $m^4$, the pinion $m'$ in gear with a pinion $m$ which receives motion from the drive wheel B, and the pinion $m^4$ in gear with a sprocket wheel on the shaft H which carries the sprockets for operating the elevator belt.

7. In a hay rake and loader, in combination, substantially as hereinbefore described, with a hay rake substantially of the side delivery class herein described, and a hay elevator projecting laterally therefrom, a doctor or feeder, located across the mouth of the elevator, and adapted to act on the hay as it is delivered from the rakes, and aid its passage to the elevator.

8. In a hay-rake and loader, in combination substantially as hereinbefore described, with a hay rake of the side delivery class substantially such as hereinbefore described, and a hay elevator extending laterally from the delivery side of said rake or raking machine, an auxiliary rake or fork located in rear of the series of rakes between them and the elevator, for the purpose specified, and operated by a crank-shaft, substantially as described.

9. In a hay rake and loader, in combination substantially as hereinbefore described, with a hay rake of the side delivery class substantially such as hereinbefore described, and a hay elevator extending laterally from the delivery side of said rake or raking machine, an auxiliary rake or fork located in rear of the series of rakes, and between them and the elevator, pivotally connected with a crank-shaft, which is at an angle to, and is rotated by gear connection with the crank-shaft D, to give orbital revolutions to the auxiliary rake or fork, and means for holding said auxiliary rake or fork in upright working positions.

10. In a hay rake and loader, in combination substantially as hereinbefore described, with a hay-rake of the side delivery class substantially such as hereinbefore described, and a hay elevator extending laterally from the delivery side of said rake or raking machine, an auxiliary rake or fork, such as $s$, pivotally connected with a crank-shaft S, which is located substantially as shown and described, at an angle to the crank-shaft D, with which it is geared by bevel pinions $s^4$, $s^5$, shaft $s^6$, sprocket wheels $s^7$, $s^9$, and chain $s^8$, and means for holding said auxiliary rake or fork in upright working position.

11. In a hay-rake and loader, in combination substantially as hereinbefore described, with a hay-rake of the side delivery class substantially such as hereinbefore described, a hay elevator extending laterally from the delivery side of said rake or raking machine, and a doctor or feeder located between the series of rakes and the elevator, and operated by gear connection with the drive wheel, an auxiliary rake or fork, such as $s$, carried on a crank-shaft which is at an angle with and is geared with and operated by the crank-shaft D, the rake or fork being held in upright working positions by a suitable check-bar or link.

In testimony whereof I affix my signature in presence of two witnesses.

MADISON REW.

Witnesses:
E. B. WILEY,
A. L. PRESTON.